United States Patent
Kim et al.

(10) Patent No.: US 7,209,608 B2
(45) Date of Patent: Apr. 24, 2007

(54) WAVELENGTH TUNABLE OPTICAL FILTER

(75) Inventors: Chang Kyu Kim, Daejeon-Shi (KR);
Myung Lae Lee, Daejeon-Shi (KR);
Chi Hoon Jun, Daejeon-Shi (JP);
Chang Auck Choi, Daejeon-Shi (KR);
Yun Tae Kim, Daejeon-Shi (KR)

(73) Assignee: Electronics and Telecommunications Research Institute, Daejeon-shi (KR)

( * ) Notice: Subject to any disclaimer, the term of this patent is extended or adjusted under 35 U.S.C. 154(b) by 235 days.

(21) Appl. No.: 10/923,838

(22) Filed: Aug. 24, 2004

(65) Prior Publication Data

US 2005/0135736 A1    Jun. 23, 2005

(30) Foreign Application Priority Data

Dec. 22, 2003   (KR) ..................... 10-2003-0094749

(51) Int. Cl.
*G02B 6/28*   (2006.01)
*G02B 6/36*   (2006.01)
*G02B 27/00*  (2006.01)
*G02B 1/10*   (2006.01)
*G02B 5/28*   (2006.01)

(52) U.S. Cl. .................... 385/24; 385/88; 359/577; 359/578; 359/579; 359/580; 359/581; 359/582; 359/583; 359/584; 359/585; 359/586; 359/587; 359/588; 359/589; 359/590

(58) Field of Classification Search .................. 385/88, 385/24; 359/260, 577–590
See application file for complete search history.

(56) References Cited

U.S. PATENT DOCUMENTS

| 6,198,565 B1* | 3/2001 | Iseki et al. ............... 359/224 |
| 6,341,039 B1 | 1/2002 | Flanders et al. |
| 6,373,632 B1* | 4/2002 | Flanders .................... 359/578 |
| 6,400,738 B1* | 6/2002 | Tucker et al. ................ 372/20 |
| 6,833,957 B2* | 12/2004 | Sato ........................ 359/579 |
| 2002/0167730 A1 | 11/2002 | Needham et al. |
| 2003/0012231 A1* | 1/2003 | Tayebati et al. .............. 372/20 |
| 2004/0223881 A1* | 11/2004 | Cunningham et al. ... 422/82.05 |
| 2004/0228575 A1* | 11/2004 | Kim et al. ................... 385/27 |
| 2005/0157392 A1* | 7/2005 | Choi et al. .................. 359/578 |

FOREIGN PATENT DOCUMENTS

KR    1020040097460    11/2004

OTHER PUBLICATIONS

Mateus et al.; "Widely Tunable Torsional Optical Filter"; IEEE Photonics Technology Letters; Jun. 2002; pp. 819-821.

(Continued)

*Primary Examiner*—Frank G. Font
*Assistant Examiner*—Jerry Martin Blevins
(74) *Attorney, Agent, or Firm*—Lowe Hauptman & Berner, LLP

(57) ABSTRACT

Provided is a Fabry-Perot type wavelength tunable optical filter, comprising a first mirror; a second mirror located over the first mirror; a driving body located over the first mirror, and having both ends fixed to the first mirror through a spacer; a plurality of electrodes, each formed on both ends of the driving body; a rod structure connecting a center of the driving body and the second mirror; a plurality of fixing means, each fixed to the first mirror at both sides of the rod structure through the spacer; and a plurality of elastic bodies connecting the rod structure with the plurality of fixing means and acting as a rotational axis. And the mirror is driven by the rod structure acting as a lever that has an elastic body as a rotational axis, when warping is generated by electro-thermal expansion, electromagnetic force or external force. Thereby the mirror can be driven in the larger wavelength tunable range and the low power consumption.

27 Claims, 3 Drawing Sheets

OTHER PUBLICATIONS

Riemenschneider et al.; "Low-Cost Electrothermally Tunable Optical Microcavities Based on GaAs"; IEEE Photonics Technology Letters; Nov. 2002; pp. 1566-1568.

Yokouchi et al.; "40 Å Continuous Tuning of a GaInAsP/InP Vertical-Cavity Surface-Emitting Laser Using an External Mirror:"; IEEE Photonics Technology Letters; Jul. 1992; pp. 701-703.

Kim et al.; "47 nm Tuning of Thermally Actuated Fabry-Perot Tunable Filter with Very Low Power Consumption"; ETRI; 2 pages.

Chang-Hasnain et al.; "Tunable VCSEL"; IEEE Photonics Technology Letters; Nov./Dec. 2000; pp. 978-987.

* cited by examiner

WAVELENGTH TUNABLE OPTICAL FILTER

BACKGROUND

1. Field of the Invention

The present invention generally relates to a wavelength tunable optical filter that adjusts a distance between two mirrors to make a desired wavelength of light incident or output and, more specifically, to a Fabry-Perot type wavelength tunable optical filter.

2. Discussion of Related Art

In general, a driving method of a wavelength tunable optical filter is largely classified into two categories. One is to adjust a distance between mirrors by a force applied to the mirrors and to provide a restoration force by a structure connected to the mirror as in an electrostatic scheme (C. J. Chang-Hasnain, *IEEE J Select. Topics Quantum Electron.*, vol. 4, pp. 978–987, 2000), and the other is by a deformation of the driving body that is connected to the mirror as in a thermal expansion scheme (C. K. Kim et al., *Proceeding of IEEE/LEOS Optical MEMES Conference* 2003, pp. 38–39, 2003), an electromagnetic scheme (C. K. Kim, Korean Patent Application No. 10-2003-0029763), and an external mechanical force scheme (N. Yokouchi et al., *IEEE Photon. Technol. Lett.*, vol. 4, pp. 701–703, 1992).

A wavelength tuning range of the wavelength tunable optical filter is determined by the maximum displacement of the driving body. For the electrostatic driving scheme to which attraction between two mirrors is applied, when the distance between two mirrors is reduced to less than ⅔ of the initial gap, a sticking phenomenon occurs, thus restricting the driving range to the ⅓ of the initial gap. To overcome this, a structure driven in a direction that the distance between the mirrors becomes farther is introduced. One method for this is that one fixed mirror, one moving mirror combined with an electrode, and a fixed electrode are arranged one after another, and a distance between the moving mirror and the fixed electrode is made larger than the distance between two mirrors, thus enabling a larger wavelength tuning range (D. C. Flanders, U.S. Pat. No. 6,341,039), and another method is that a lever type in which a mirror and an electrode unit are placed to be isolated from each other at both sides of a long rod structure is employed to increase a driving range as well as not to incur the sticking phenomenon (C. F. R. Mateus et al., *IEEE Photon. Technol. Lett.*, vol. 14, pp. 819–821, 2002).

The structure in which the rod type driving body is deformed by means of the thermal expansion, the electromagnetic force or the external mechanical force also employs the physical deformation of the driving body only, thus limiting the displacement of the mirror.

SUMMARY OF THE INVENTION

The present invention is directed to a wavelength tunable optical filter in which a mirror is driven by a rod structure acting as a lever that has an elastic body as a rotational axis, when warping of an actuator is generated by thermal expansion, electromagnetic force or external mechanical force.

The present invention is also directed to a Fabry-Perot wavelength tunable optical filter with which power consumption is reduced and a driving in both directions can be enabled in one device.

One aspect of the present invention is to provide a wavelength tunable optical filter comprising: a first mirror; a second mirror located over the first mirror to match an optic axis; a driving body located over the first mirror, having both ends fixed to the first mirror through a spacer; a plurality of electrodes, each formed on both ends of the driving body; a rod structure connecting a center of the driving body and the second mirror; a plurality of fixing means, each fixed to the first mirror at both sides of the rod structure through the spacer; and a plurality of elastic bodies connecting the rod structure with the plurality of fixing means and acting as a rotational axis.

Another aspect of the present invention is to provide a wavelength tunable optical filter comprising: a first mirror; a second mirror located above the first mirror to match an optic axis; a driving body located over the first mirror, having both ends fixed to the first mirror through a spacer; a plurality of electrodes, each formed on both ends of the driving body; a rod structure passing through a center of the driving body and connected with the second mirror at one end; and a fixing means fixed to the first mirror through the spacer, and fixing the other end of the rod structure to act as a rotational axis.

Still another aspect of the present invention is to provide a wavelength tunable optical filter comprising: a first mirror; a second mirror located above the first mirror to match an optic axis; a first and a second driving bodies located over the first mirror in parallel with each other, having both ends fixed to the first mirror through a spacer; a plurality of electrodes, each formed on both ends of the first driving body and the second driving body; and a rod structure passing through a center of the first driving body and the second driving body and connected with the second mirror at one end.

Still another aspect of the present invention is to provide a wavelength tunable optical filter further comprising: a third driving body and a fourth driving body located over the first mirror in parallel with each other, having both ends fixed to the first mirror through a spacer; a plurality of electrodes, each formed on both ends of the third driving body and the fourth driving body; and a rod structure passing through a center of the third driving body and the fourth driving body and connected with the second mirror at one end.

Still another aspect of the present invention is to provide a wavelength tunable optical filter comprising: a first mirror; a second mirror located over the first mirror whose optic axis is aligned with that of the first mirror; at least two of rod structures located over the first mirror and symmetrically connected to the second mirror; at least two of driving bodies connected to each rod structure, and having both ends fixed to the first mirror; a plurality of fixing means fixed to the first mirror at both sides of each rod structure; and a plurality of elastic bodies connecting the rod structure with the plurality of fixing means and acting as a rotational axis.

Still another aspect of the present invention is to provide a wavelength tunable optical filter comprising: a first mirror; a second mirror located over the first mirror whose optic axis is aligned with that of the first mirror; at least two of rod structures located over the first mirror and symmetrically connected to the second mirror; at least two of driving bodies connected to each rod structure, and having both ends fixed to the first mirror; and a fixing means fixed to the first mirror, and fixing the other end of each rod structure to act as a rotational axis.

Still another aspect of the present invention is to provide a wavelength tunable optical filter comprising: a first mirror; a second mirror located over the first mirror whose optic axis is aligned with that of the first mirror; at least two of rod structures located over the first mirror and symmetrically connected to the second mirror; at least two of first and second driving bodies connected to each rod structure, and having both ends fixed to the first mirror; and a fixing means fixed to the first mirror, and fixing the other end of each rod structure to act as a rotational axis.

A distance between the first mirror and the second mirror is determined by a thickness of the spacer.

BRIEF DESCRIPTION OF THE DRAWINGS

The above and other features of the present invention will be described in reference to certain exemplary embodiments thereof with reference to the attached drawings in which.

DETAILED DESCRIPTION OF PREFERRED EMBODIMENTS

The preferred embodiments of the present invention will now be described in detail with reference to the accompanying drawings.

Figure 1:
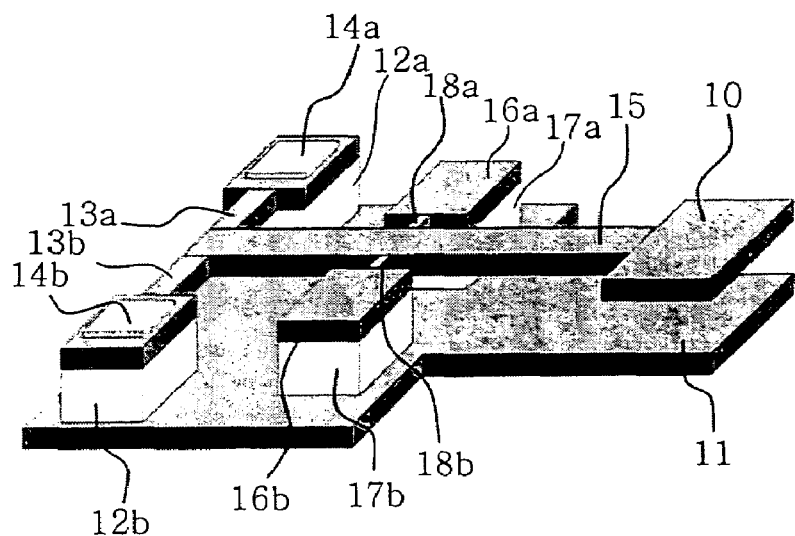
FIG. 1 is a structural diagram of a wavelength tunable optical filter according to a first embodiment of the present invention.

FIG. 1 is a structural diagram of a wavelength tunable optical filter according to a first embodiment of the present invention, wherein an electro-thermal driving body and a mirror are connected to both ends of a rod structure that acts as a lever, respectively.

An upper mirror 10 and a lower mirror 11 are spaced apart from each other by an air layer interposed therebetween. An optic axis of the upper mirror 10 and the lower mirror 11 are aligned. For the upper mirror 10 separated by the predetermined distance from the lower mirror 11, electro-thermal driving bodies 13a, 13b fixed to the lower mirror 11 through spacers 12a, 12b are placed in both sides of the one end of a rod structure 15, and electrodes 14a, 14b are formed on the surfaces of outer ends in the electro-thermal driving bodies 13a, 13b, respectively. A center of the electro-thermal driving body 13 and the upper mirror 10 are connected by a rod structure 15. At both sides of the rod structure 15, fixing means 16a, 16b fixed to the lower mirror 11 through the spacers 17a, 17b are placed, and the fixing means 16a, 16b are connected to the rod structure 15 through rotational axes 18a, 18b made of an elastic body, respectively. An initial distance between the upper mirror 10 and the lower mirror 11 is determined based on the thickness of the spacer 12a, 12b, 17a and 17b.

Figure 2A:
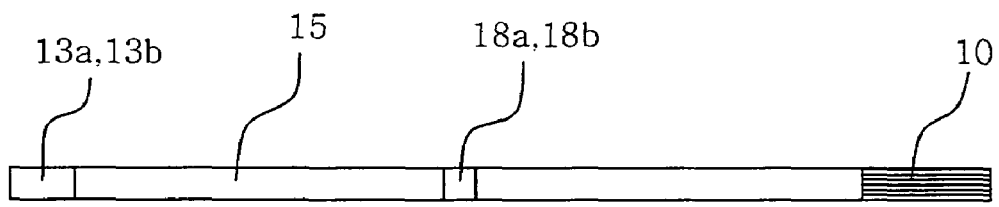
FIGS. 2A to 2C are cross sectional views for illustrating a behavior of a wavelength tunable optical filter according to a first embodiment of the present invention.
Figure 2B:
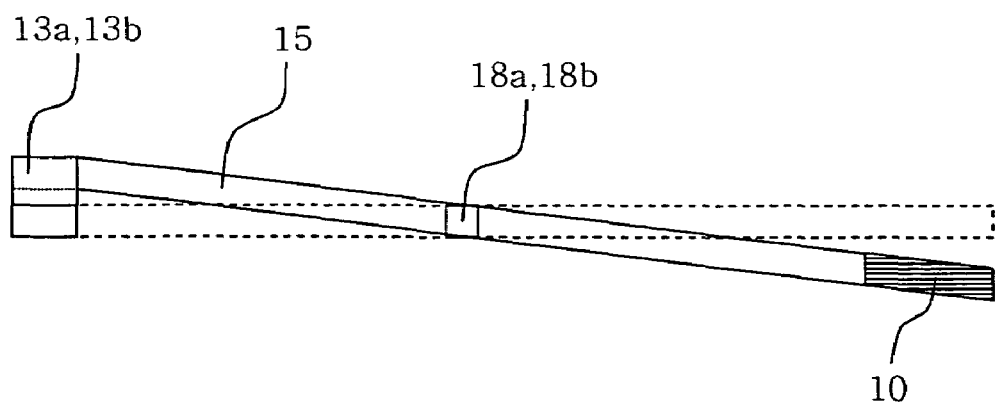
Figure 2C:
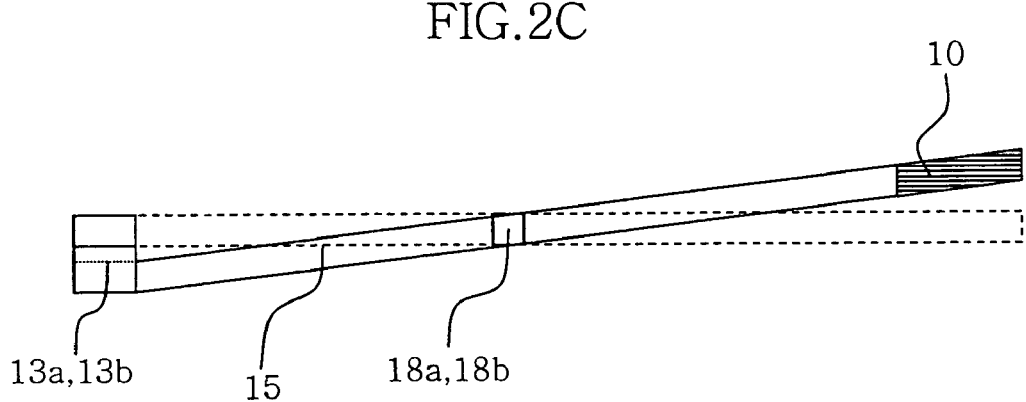

FIGS. 2A to 2C are cross sectional views for illustrating a behavior of a wavelength tunable optical filter according to a first embodiment of the present invention.

To provide a better understanding of a driving principle, only the electro-thermal driving bodies 13a, 13b, the rod structure 15, the rotational axes 18a, 18b and the upper mirror 10 are schematically illustrated.

When a voltage is not applied to the electrodes 14a, 14b, a current does not flow through the electro-thermal driving bodies 13a, 13b. Therefore, as shown in FIG. 2A, the electro-thermal driving bodies 13a, 13b, the rod structure 15, the rotational axes 18a, 18b and the upper mirror 10 remain stable.

When the voltage is applied to the electrodes 14a, 14b to flow the current through the electro-thermal driving bodies 13a, 13b, the electro-thermal driving bodies 13a, 13b undergo the thermal expansion. Here, outer ends of the electro-thermal driving bodies 13a, 13b are fixed to the lower mirror 11 through the spacers 12a, 12b, so that the center of electro-thermal driving bodies 13a, 13b, that is, the portion connected to the rod structure 15 are warped upward or downward according as the difference between the thermal expansion coefficients or the internal stresses, and the middle of the rod structure 15 are fixed through the elastic bodies 18a, 18b, so that the upper mirror 10 connected to the rod structure 15 and opposite to the electro-thermal driving bodies 13a, 13b is driven in a direction opposite to the center of the electro-thermal driving bodies 13a, 13b through the lever principle. FIG. 2B is for a case where the upper mirror 10 is driven downward to become closer to the lower mirror 11 as the center of the electro-thermal driving bodies 13a, 13b warps upward, and FIG. 2C is for a case where the upper mirror 10 is driven upward to become farther to the lower mirror 11 as the center of the electro-thermal driving bodies 13a, 13b warps downward.

Although this embodiment has been illustrated with reference to the thermally expansible driving body, the driving body warped by an electromagnetic force to the current by an external magnetic field, or the driving body warped by applying a physical force to the rod can be applied.

Figure 3:
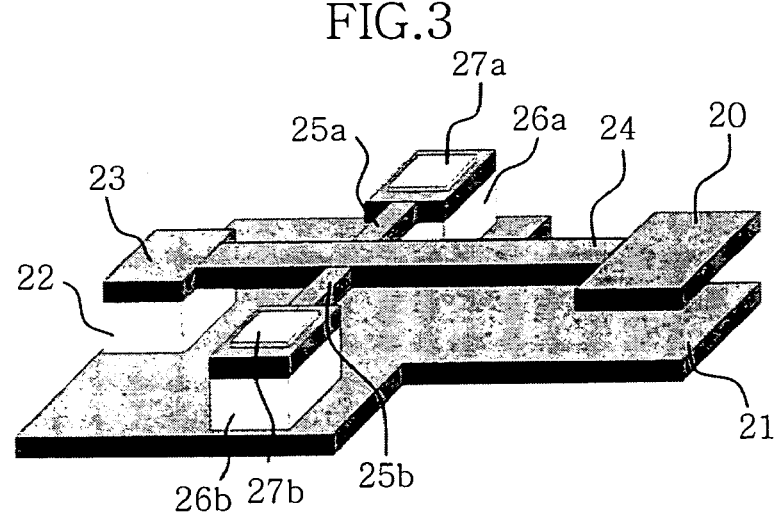
FIG. 3 is a structural diagram of a wavelength tunable optical filter according to a second embodiment of the present invention.

FIG. 3 is a structural diagram of a wavelength tunable optical filter according to a second embodiment of the present invention, in which the electro-thermal driving body is connected in the middle of the rod structure.

An upper mirror 20 and a lower mirror 21 are spaced apart from each other by an air layer interposed therebetween. An optic axis of the upper mirror 20 and the lower mirror 21 are aligned. For the upper mirror 20 separated by the predetermined distance from the lower mirror 21, fixing means 23 is placed, which is fixed to the lower mirror 21 through a spacer 22. The fixing means 23 and the upper mirror 20 are connected by a rod structure 24. At both sides of the rod structure 24 between the fixing means 23 and the upper mirror 20, the electro-thermal driving bodies 25a, 25b are connected respectively, and the other end of each electro-thermal driving bodies 25a, 25b is fixed to the lower mirror 21 through the spacers 26a, 26b, and electrodes 27a, 27b are formed respectively on the surfaces of the ends of the electro-thermal driving bodies 25a, 25b. An initial distance between the upper mirror 20 and the lower mirror 21 can be adjusted based on the thickness of the spacer 22, 25a, 25b. Preferably, for the electro-thermal driving bodies 25a, 25b, the portion connected to the rod structure 24 is formed narrower than the portion fixed to the spacers 26a, 26b.

Figure 4A:
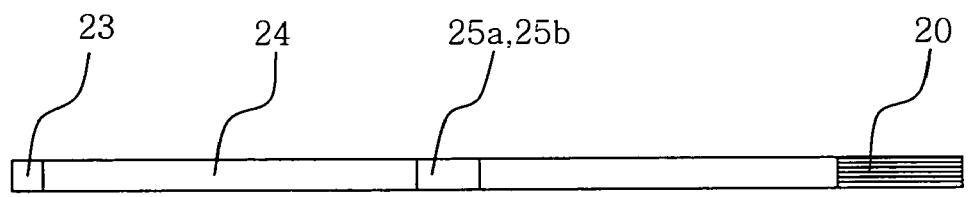
FIGS. 4A to 4C are cross sectional views for illustrating a behavior of a wavelength tunable optical filter according to a second embodiment of the present invention.
Figure 4B:
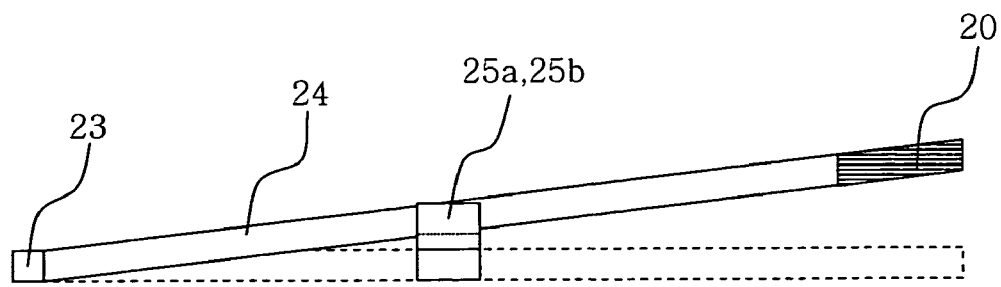
Figure 4C:
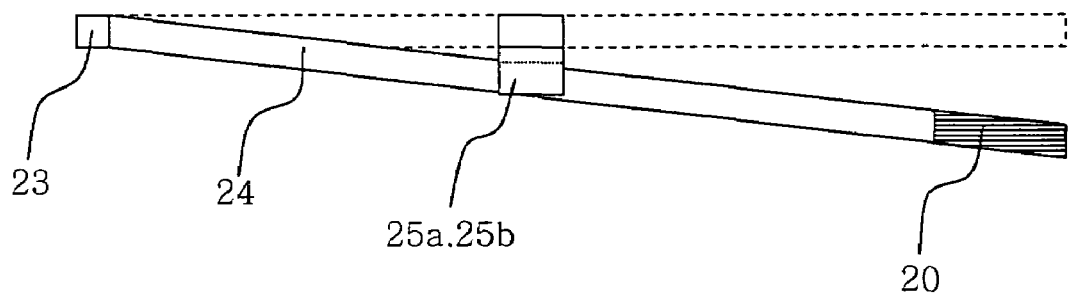

FIGS. 4A to 4c are cross sectional views for illustrating a behavior of a wavelength tunable optical filter according to a second embodiment of the present invention.

To provide a better understanding of a driving principle, only the fixing means 23, the rod structure 24, the electro-thermal driving bodies 25a, 25b and the upper mirror 20 are schematically illustrated.

When a voltage is not applied to the electrodes 27a, 27b, a current does not flow through the electro-thermal driving bodies 25a, 25b. Therefore, as shown in FIG. 4A, the fixing means 23, the rod structure 24, the electro-thermal driving bodies 25a, 25b and the upper mirror 20 remain stable.

When the voltage is applied to the electrodes 27a, 27b to flow the current through the electro-thermal driving bodies 25a, 25b, the electro-thermal driving bodies 25a, 25b undergo the thermal expansion. Each of the outer ends of the electro-thermal driving bodies 25a, 25b is fixed to the lower mirror 21 through the spacers 26a, 26b, so that the center of electro-thermal driving bodies 25a, 25b, that is, the portion connected to the rod structure 24 are warped upward or downward according as the difference between the thermal expansion coefficients or the internal stresses. Since one end of the rod structure 24 is fixed to the fixing means 23, the rod structure 24 overall warps in the same direction, and accordingly, the upper mirror 20 connected to the rod structure 24 is also driven in the same direction as the electro-thermal driving bodies 25a, 25b.

FIG. 4B is for a case where the upper mirror 20 is driven upward to become farther to the lower mirror 21 as the center of the electro-thermal driving bodies 25a, 25b connected to the rod structure 24 warps upward, and FIG. 4C is for a case where the upper mirror 20 is driven downward to become closer to the lower mirror 21 as the center of the electro-thermal driving bodies 25a, 25b connected to the rod structure 24 warps downward.

In this embodiment, one end of the rod structure 24 is fixed to the fixing means 23 to serve as a rotational axis, and the upper mirror 20 is driven according to the movement of the electro-thermal driving bodies 25a, 25b connected to the middle of the rod structure 24.

According to the first and second embodiments, the movement direction of the electro-thermal driving body is determined during the fabrication process, and only one direction between the direction that the mirrors become closer and the direction that the mirrors become farther can be driven. Therefore, according to the present invention, a wavelength tunable optical filter is configured with which both the direction that the mirrors become closer and the direction that the mirrors become farther can be driven.

Figure 5:
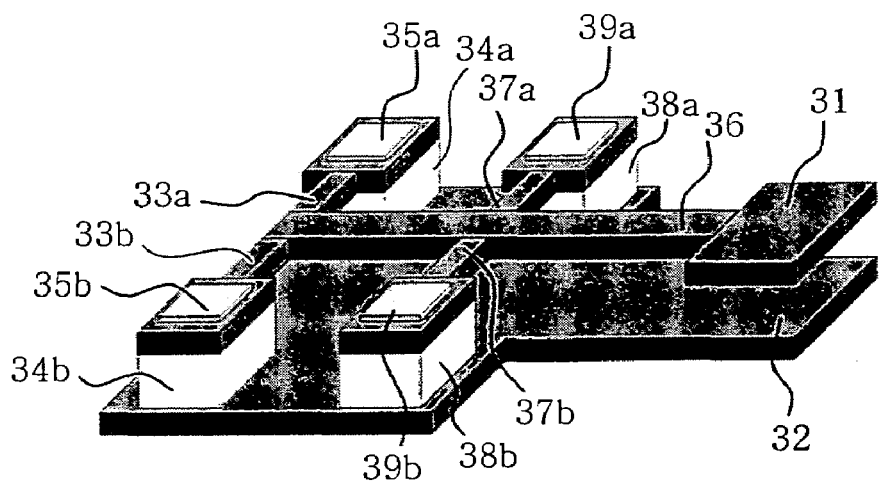
FIG. 5 is a structural diagram of a wavelength tunable optical filter according to a third embodiment of the present invention.

FIG. 5 is a structural diagram of a wavelength tunable optical filter according to a third embodiment of the present invention, in which the mirrors can be driven both in the direction that the mirrors become closer and in the direction that the mirrors become farther.

An upper mirror 31 and a lower mirror 32 are spaced apart from each other by an air layer interposed therebetween. An optic axis of the upper mirror 31 and the lower mirror 32 are aligned. For the upper mirror 31 separated by the predetermined distance from the lower mirror 32, electro-thermal driving bodies 33a, 33b, 37a and 37b fixed to the lower mirror 32 through spacers 34a, 34b, 38a and 38b are placed in both sides, in parallel with each other, and electrodes 35a, 35b, 39a and 39b are formed on the surface of outer ends of the electro-thermal driving bodies 33a, 33b, 37a and 37b, respectively. Centers of the electro-thermal driving bodies 33a, 33b, 37a and 37b and the upper mirror 31 are connected by a rod structure 36. An initial distance between the upper mirror 31 and the lower mirror 32 is determined based on the thickness of the spacer 34a, 34b, 38a and 38b.

The mirror of the wavelength tunable optical filter fabricated as described above can be driven in both directions. Two electro-thermal driving bodies formed by a single fabrication process on one substrate warp in the same direction due to the current flow because the inherent stress is the same. Therefore, when the electro-thermal driving body is fabricated to warp upward, if the current flows to the electro-thermal driving bodies 33a, 33b farther to the upper mirror 31, the electro-thermal driving bodies 37a, 37b closer to the upper mirror 31 serve as a rotational axis, so that the upper mirror 31 is driven downward by a lever principle, while if the current flows to the electro-thermal driving bodies 37a, 37b closer to the upper mirror 31, the electro-thermal driving bodies 33a, 33b farther to the upper mirror 31 serve as a rotational axis, so that the upper mirror 31 is driven upward.

Contrary to this, when the electro-thermal driving body is fabricated to warp downward, if the current flows to the electro-thermal driving bodies 33a, 33b farther to the upper mirror 31, the electro-thermal driving bodies 37a, 37b closer to the mirror 31 serve as a rotational axis, so that the upper mirror 31 is driven upward by a lever principle, while if the current flows to the electro-thermal driving bodies 37a, 37b closer to the upper mirror 31, the electro-thermal driving bodies 33a, 33b farther to the upper mirror 31 serve as a rotational axis, so that the upper mirror 31 is driven downward.

Figure 6:
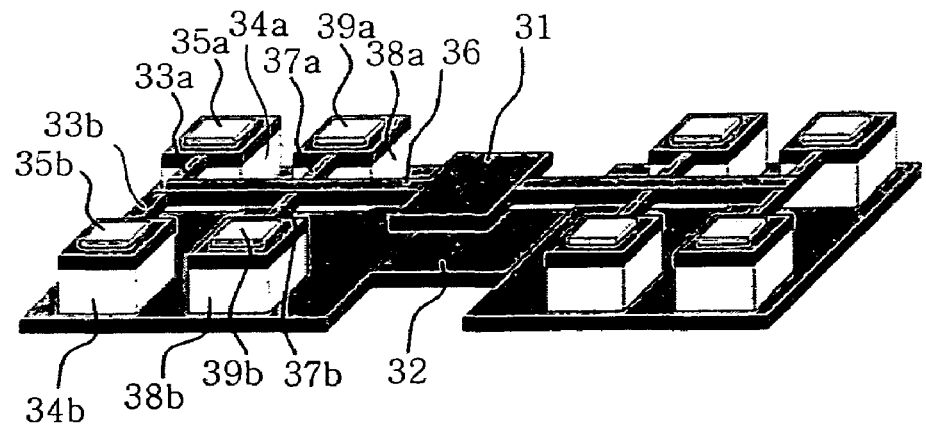
FIG. 6 is a structural diagram of a wavelength tunable optical filter according to a fourth embodiment of the present invention.

FIG. 6 is a structural diagram of a wavelength tunable optical filter according to a fourth embodiment of the present invention.

In the first, second, and third embodiments, the rod structure is connected to only one side of the mirror. Therefore, when the rod structure is driven by the lever principle, parallelism between two mirrors can be broken, so that in order to prevent this, the rod structures are symmetrically connected to both sides of the mirror, respectively, as shown in FIG. 6, and the electro-thermal driving bodies are connected to the end and the middle of each rod structure as shown in FIG. 5.

Further, at least two rod structures can be connected to one mirror, and the electro-thermal driving bodies can be connected to each rod structure as described in the first, second and the third embodiments to be driven while keeping the mirrors in parallelism.

As described above, according to the present invention, a driving range of the mirror is expanded using a lever principle. When the mirror is driven by thermal expansion, physical expansion or external force without lever structure, it moves as much as the displacement of the center of the driving body, while by the lever principle as described in the present invention, the range of the tunable wavelength can be expanded. The structure using the thermal expansion or the electromagnetic force has a drawback in that it has larger power consumption than the structure driven by the electrostatic force, however, with the lever principle, the driving body requests a little movement to drive the designated wavelength tuning range, thus significantly reducing the power consumption.

Further, the wavelength tunable optical filter of the present invention capable of driving upward and downward can expand the wavelength tuning range twice than before, and adjust the current to determine the driving direction. Generally, for the wavelength tunable optical filter using the rotation, the insertion loss and the line width are increased due to the increasing angle between two mirrors, thus degrading an optical characteristic, while in the present invention, at least two driving bodies are symmetrically arranged to keep two mirrors in parallel for every driving range and the optical characteristics can remain the same.

What is claimed is:

1. A wavelength tunable optical filter comprising:
a first mirror;
a second mirror located over the first mirror whose optic axis is aligned with that of the first mirror;
a driving body located over the first mirror, and having both ends fixed to the first mirror;
a rod structure connecting a center of the driving body and the second mirror;
a plurality of fixing means fixed to the first mirror at both sides of the rod structure; and
a plurality of elastic bodies connecting the rod structure with the plurality of fixing means and acting as a rotational axis.

2. The wavelength tunable optical filter according to claim 1, wherein both ends of the driving body are fixed to the first mirror through a spacer and the plurality of fixing means are fixed to the first mirror through a spacer, respectively.

3. The wavelength tunable optical filter according to claim 1, further comprising:
a plurality of electrodes formed on both ends of the driving body, respectively.

4. The wavelength tunable optical filter according to claim 1, wherein an initial distance between the first mirror and the second mirror is determined by a thickness of a spacer.

5. A wavelength tunable optical filter comprising:
a first mirror;
a second mirror located over the first mirror whose optic axis is aligned with that of the first mirror;
a driving body located over the first mirror, and having both ends fixed to the first mirror;
a rod structure passing through a center of the driving body and connected with the second mirror at one end; and
a fixing means located the first mirror and fixed to the first mirror, and fixing the other end of the rod structure to act as a rotational axis.

6. The wavelength tunable optical filter according to claim 5, wherein both ends of the driving body are fixed to the first mirror through a spacer and the fixing means is fixed to the first mirror through a spacer, respectively.

7. The wavelength tunable optical filter according to claim 5, further comprising: a plurality of electrodes formed on both ends of the driving body, respectively.

8. The wavelength tunable optical filter according to claim 5, wherein an initial distance between the first mirror and the second mirror is determined by a thickness of a spacer.

9. A wavelength tunable optical filter comprising:
a first mirror;
a second mirror located over the first mirror whose optic axis is aligned with that of the first mirror;
a first driving body and a second driving body located over the first mirror in parallel with each other, each driving body having both ends fixed to the first mirror; and
a rod structure passing through a center of the first driving body and the second driving body and connected with the second mirror at one end.

10. The wavelength tunable optical filter according to claim 9, wherein both ends of the first driving body and the second driving body are fixed to the first mirror through a spacer, respectively.

11. The wavelength tunable optical filter according to claim 9, further comprising:
a plurality of electrodes formed on both ends of the first driving body and the second driving body, respectively.

12. The wavelength tunable optical filter according to claim 9, further comprising:
a third driving body and a fourth driving body located over the first mirror in parallel with each other, and having both ends fixed to the first mirror; and
a rod structure passing through a center of the third driving body and the fourth driving body and connected with the second mirror at one end.

13. The wavelength tunable optical filter according to claim 12, wherein both ends of the third driving body and the fourth driving body are fixed to the first mirror through a spacer, respectively.

14. The wavelength tunable optical filter according to claim 12, further comprising:
a plurality of electrodes formed on both ends of the third driving body and the fourth driving body, respectively.

15. The wavelength tunable optical filter according to claim 9, wherein an initial distance between the first mirror and the second mirror is determined by a thickness of a spacer.

16. A wavelength tunable optical filter comprising:
a first mirror;
a second mirror located over the first mirror whose optic axis is aligned with that of the first mirror;
at least two of rod structures located over the first mirror and symmetrically connected to the second mirror;
at least two of driving bodies connected to each rod structure, and having both ends fixed to the first mirror;
a plurality of fixing means fixed to the first mirror at both sides of each rod structure; and
a plurality of elastic bodies connecting the rod structure with the plurality of fixing means and acting as a rotational axis.

17. The wavelength tunable optical filter according to claim 16, wherein both ends of each driving body are fixed to the first mirror through a spacer and the plurality of fixing means are to the first mirror through a spacer, respectively.

18. The wavelength tunable optical filter according to claim 16, further comprising:
a plurality of electrodes formed on both ends of each driving body, respectively.

19. The wavelength tunable optical filter according to claim 16, wherein an initial distance between the first mirror and the second mirror is determined by a thickness of a spacer.

20. A wavelength tunable optical filter comprising:
a first mirror;
a second mirror located over the first mirror whose optic axis is aligned with that of the first mirror;
at least two of rod structures located over the first mirror and symmetrically connected to the second mirror at one end;
at least two of driving bodies connected to each rod structure, and having both ends fixed to the first mirror; and
a fixing means fixed to the first mirror, and fixing an other end of each rod structure to act as a rotational axis.

21. The wavelength tunable optical filter according to claim 20, wherein both ends of each driving body are fixed to the first mirror through a spacer and the fixing means is fixed to the first mirror through a spacer, respectively.

22. The wavelength tunable optical filter according to claim 20, comprising:
a plurality of electrodes formed on both ends of each driving body, respectively.

23. The wavelength tunable optical filter according to claim 20, wherein an initial distance between the first mirror and the second mirror is determined by a thickness of a spacer.

24. A wavelength tunable optical filter comprising:
   a first mirror;
   a second mirror located over the first mirror whose optic axis is aligned with that of the first mirror;
   at least two of first and second driving bodies located over the first mirror in parallel with each other, and having both ends fixed to the first mirror; and
   at least two of rod structures symmetrically connected with the second mirror, and passing through a center of the first and second driving bodies.

25. The wavelength tunable optical filter according to claim 24, wherein both ends of each first and second driving bodies are fixed to the first mirror through a spacer, respectively.

26. The wavelength tunable optical filter according to claim 24, comprising:
   a plurality of electrodes formed on both ends of each first and second driving bodies, respectively.

27. The wavelength optical filter according to claim 24, wherein an initial distance between the first mirror and the second mirror is determined by a thickness of a spacer.

* * * * *